United States Patent
Berenz et al.

(10) Patent No.: US 6,724,920 B1
(45) Date of Patent: Apr. 20, 2004

(54) APPLICATION OF HUMAN FACIAL FEATURES RECOGNITION TO AUTOMOBILE SAFETY

(75) Inventors: John J. Berenz, San Pedro, CA (US); George W. McIver, Redondo Beach, CA (US); Joseph W. Niesen, La Mirada, CA (US); Barry Dunbridge, Torrance, CA (US); Gregory A. Shreve, Huntsville, AL (US)

(73) Assignee: TRW Inc., Redondo Beach, CA (US)

( * ) Notice: Subject to any disclaimer, the term of this patent is extended or adjusted under 35 U.S.C. 154(b) by 161 days.

(21) Appl. No.: 09/621,160

(22) Filed: Jul. 21, 2000

(51) Int. Cl.$^7$ ................................................ G06K 9/00
(52) U.S. Cl. .................. 382/118; 340/425.5; 340/5.53; 340/575; 280/735; 180/169; 180/272; 382/104
(58) Field of Search ................ 382/105, 103, 382/104, 106, 118, 278; 280/735, 730.1, 734; 340/436, 426, 438, 439, 988, 573.1, 575, 576, 5.53, 425.5; 701/45, 49, 46; 250/338.5; 307/10.1; 180/169, 272

(56) References Cited

U.S. PATENT DOCUMENTS

| | | | |
|---|---|---|---|
| 4,509,040 A | * 4/1985 | Seko et al. .................. 340/576 |
| 4,625,329 A | 11/1986 | Ishikawa et al. |
| 4,648,052 A | 3/1987 | Freidman et al. |
| 4,720,189 A | 1/1988 | Heynen et al. |
| 5,008,946 A | 4/1991 | Ando |
| 5,729,619 A | * 3/1998 | Puma .......................... 382/115 |
| 5,829,782 A | 11/1998 | Breed et al. |
| 5,835,613 A | 11/1998 | Breed et al. |
| 5,845,000 A | 12/1998 | Breed et al. |
| RE36,041 E | 1/1999 | Turk et al. |
| 6,046,671 A | * 4/2000 | Shimoura et al. ........... 340/439 |
| 6,060,989 A | 5/2000 | Gehlot |
| 6,079,738 A | 6/2000 | Lotito et al. |
| 6,144,366 A | 11/2000 | Numazaki et al. |
| 6,154,559 A | * 11/2000 | Beardsley .................... 382/103 |
| 6,225,890 B1 | * 5/2001 | Murphy ....................... 340/426 |
| 6,324,453 B1 | * 11/2001 | Breed et al. ............. 280/730.1 |

FOREIGN PATENT DOCUMENTS

| | | |
|---|---|---|
| DE | 4416507 | 11/1995 |
| DE | 19645175 | 5/1998 |
| DE | 19757595 | 7/1999 |
| EP | 0669227 | 8/1995 |
| EP | 0924123 | 6/1999 |
| WO | 0038949 | 7/2000 |

OTHER PUBLICATIONS

J. Krumm, G. Kirk; "Video Occupant Detection for Air Bag Deployment", Sandia Commercially Valuable Information, SAND97–0408, Feb. 1997, pps. 1–20.

(List continued on next page.)

Primary Examiner—Jayanti K. Patel
Assistant Examiner—Sheela Chawan
(74) Attorney, Agent, or Firm—Tarolli, Sundheim, Covell & Tummino L.L.P.

(57) ABSTRACT

An imaging system (50) for providing vehicle safety features that employs face recognition software to identify and track a person. The system (50) employs infrared emitters (30) that emit an infrared signal along a predetermined field-of-view, and an infrared sensor (34), such as a CMOS sensor used as a video signal array, that receives reflected infrared illumination from objects in the field-of-view. A processor (52) including the face recognition software, is employed to detect human faces to identify and track the person. Once a face is detected, it can be compared to a data base to identify the person. Various applications for the imaging system (50) for providing vehicle safety features include identifying the driver or passenger for personalizing the vehicle's airbags, providing pre-crash collision avoidance, providing blind spot detection, providing vehicle crash recording, and providing a warning signal if the driver appears drowsy.

7 Claims, 6 Drawing Sheets

OTHER PUBLICATIONS

Pending U.S. Berenz et al. Patent Appln. Serial No. 09/607,090, filed Jun. 29, 2000 entitled Human Presence Detection, Identification and Tracking Using A Facial Feature Image Sensing System For Airbag Deployment, Attorney Dockey No. TRW(TE)6545.

Pending U.S. Berenz et al. Patent Appln. Serial No. 09/621,772, filed Jul. 21, 2000 entitled Application of Human Facial Features Recognition to Automobile Security and Convenience, Attorney Docket No. TRW9TE)6546.

Pending U.S. Berenz et al. Patent Appln. Serial No. 09/607,008, filed Jun. 29, 2000 entitled Optimized Human Presence Detection Through Elimination of Background Interference, Attorney Docket No. TRW(TE)6548.

* cited by examiner

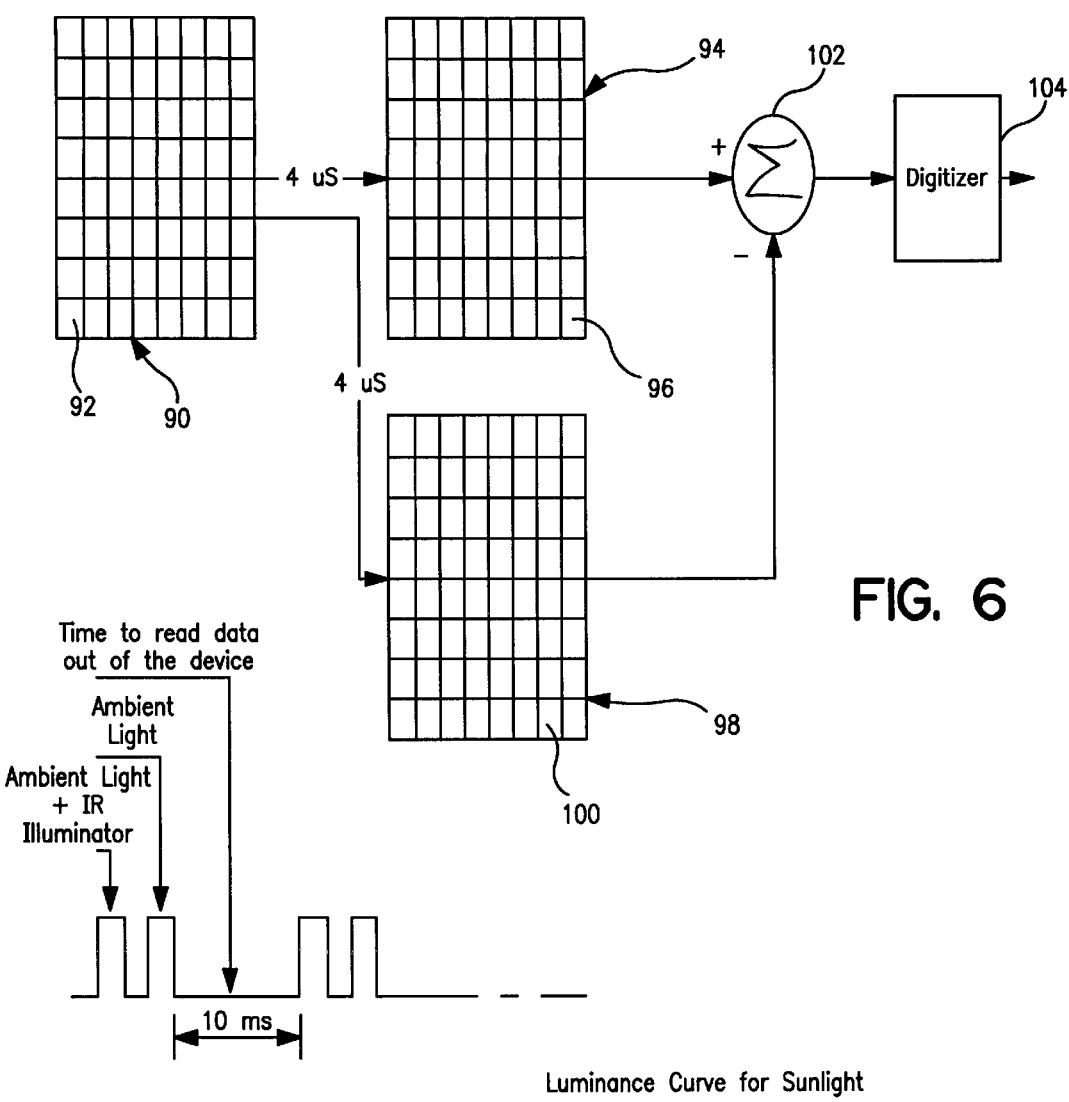
FIG. 6
FIG. 7
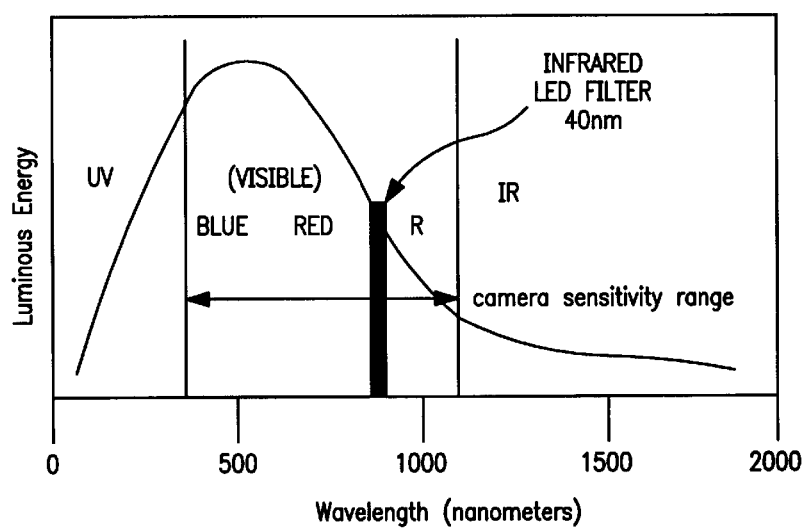
FIG. 3

APPLICATION OF HUMAN FACIAL FEATURES RECOGNITION TO AUTOMOBILE SAFETY

BACKGROUND OF THE INVENTION

1. Field of the Invention

This invention relates generally to an imaging system in a vehicle for detecting the presence of a person and, more particularly, to an imaging system for use in a vehicle that identifies a human face, and uses this information for vehicle safety purposes.

2. Discussion of the Related Art

The National Highway Traffic Safety Administration requires passenger side airbags on all passenger cars manufactured after 1998. Airbags have saved thousands of lives, but safer airbag deployment systems can save even more lives. Proposals have been submitted by the National Highway Traffic Safety Administration to require advanced airbags that are safer and more efficient. Thus, there is a need in the art for an advanced airbag deployment system that determines airbag deployment depending on the detection, identify and tracking of a person in the passenger seat of the vehicle.

Future airbag deployment systems will be able to identify and track a person in the passenger seat of the vehicle. Based on this information, the system will provide signals whether to fire the airbag, fire the airbag at low velocity or fire the airbag at normal high velocity during a crash event, depending on whether a person is seated in the passenger seat, the size of the person and the position of the person relative to the airbag deployment door. In one example, if a person is detected in the passenger seat, and is some small distance (for example, within three inches) from the airbag door, then the airbag does not fire during a crash event. If a person is detected in the passenger seat, and is close (for example, between three and eight inches) to the airbag door, the airbag is fired at a lower velocity during a crash even. If the person is detected in the passenger seat, and far enough away (for example, more than eight inches) from the airbag door, then the airbag is fired at normal high velocity during a crash event.

Present passenger sensing systems typically include ultrasonic, weight, infrared and/or electromagnetic sensors to detect a passenger for airbag deployment. Ultrasonic sensing systems sense the motion of objects within the passenger seat area and determine whether the object is moving closer or farther away from the sensor location. However, ultrasonic sensors don't identify the nature of the object, and thus can't tell if it is a person or some other object, such as a bag of groceries. Similar to ultrasonic sensors, microwave sensors employed in active doppler radar systems can track objects, but cannot identify human presence. Weight sensors identify objects in the passenger seat based on applied pressure, but don't consider the passenger's location relative to the airbag. Passive IR sensors acquire thermal images of the passenger seat, but these systems are very costly. Present active IR sensors sense the relative location of the passenger relative to the airbag, but cannot identify human presence. Electromagnetic systems include LC resonant circuits where body capacitance is used to detect presence and identify objects, but these systems can not track the objects.

U.S. Pat. No. 5,835,613 issued to Breed et al., Nov. 10, 1998, discloses a vehicle interior monitoring system that claims to identify, locate and monitor persons in the passenger compartment of the vehicle. The monitoring system employs infrared emitters that illuminate the interior of the vehicle, and charge couple device (CCD) arrays that detect the radiation. Outputs from the CCD arrays are analyzed by computational devices that employ pattern recognition algorithms to classify, identify or locate the content or objects in the passenger seat. The pattern recognition system for determining vehicle occupants disclosed in the '613 patent employs complicated software that must learn the shape of an individual in all kinds of lighting situations under various conditions. Additionally, employing pattern recognition in this manner is limited in its ability to track the individual as he or she moves around in the passenger seat. Further, the ability to identify and track humans by general pattern recognition is questionably unreliable. Pattern recognition cannot identify who the person is, only detect an object's shape.

What is needed is an improved airbag deployment sensor and system that is able to effectively identify and track a person in the passenger seat of a vehicle. It is therefore an object of the present invention to provide such a sensing system for vehicle passenger airbag deployment.

SUMMARY OF THE INVENTION

In accordance with the teachings of the present invention, an imaging system for providing vehicle safety features is disclosed that employs face recognition software and algorithms to identify and track a person. The system includes infrared emitters that emit an infrared signal along a predetermined field-of-view, and an infrared sensor, such as a CMOS sensor used as a video signal array, that receives reflected infrared illumination from objects in the field-of-view. A processor, including the face recognition software, is employed to detect human faces. Once a face is detected, it can be compared to a data base to identify the person.

Various applications of the imaging system for providing vehicle safety features include identifying the driver or passenger for personalizing the vehicle's airbags, providing pre-crash collision avoidance, providing blind spot detection, providing vehicle crash recording, and providing a warning signal if the driver appears drowsy.

Additional objects, advantages and features of the present invention will become apparent from the following description and appended claims, taken in conjunction with the accompanying drawings.

BRIEF DESCRIPTION OF THE DRAWINGS

FIG. 3 is a graph with wavelength on the horizontal axis and luminous energy on the vertical axis showing the luminance curve for sunlight;

FIG. 6 is a schematic diagram depicting a frame differencing technique used in the airbag deployment system of the present invention;

FIG. 7 is a timing diagram for the frame differencing technique of the invention;

DETAILED DESCRIPTION OF THE PREFERRED EMBODIMENTS

The following discussion of the preferred embodiments directed to an airbag deployment system that employs human facial feature recognition is merely exemplary in nature, and is in no way intended to limit the invention or its applications or uses.

According to one embodiment of the present invention, a technique for detecting, identifying and tracking a person in the passenger seat of a vehicle is disclosed. As discussed above, it is sometimes desirable to deploy a passenger side airbag in a vehicle at low velocity, or not deploy the airbag, during a crash event, depending on whether a person is occupying the passenger seat of the vehicle, the proximity of the person to the airbag door, and the size of the person. According to the present invention, the identification and tracking of the person is determined by face recognition software, in particular, software that recognizes and tracks the person's eyes and other facial features. Tracking can take place that way at many head angles and poses. The software algorithm would use calibrated face and feature separation to estimate range. The tracking of a localized area on the human face allows more image frames to be acquired per second, permitting more frequent tracking of the person. The more frequent tracking of the facial features will prevent acquiring a blurry image because the image is updated more frequently.

Various software is known in the art that processes data from video data patterns received from an object being analyzed, and determines whether the object has a face. For example, such software includes the Visionics Face-It software, well known to those skilled in the art. It is stressed that the present invention is not limited to any particular facial feature mapping function, but can include any known algorithm, suitable for the purposes described herein, for recognizing facial features, whether it be two-dimensional or three-dimensional, that are then also to be used for ranging functions, as well. Further, according to the present invention, ranging algorithms are used in combination with the know face recognition software.

As will be discussed in detail below, the present invention employs infrared radiation reflected off of objects in the passenger side of the passenger compartment of a vehicle that is received by an electronic video camera. The video camera generates the electrical signals and image used by the face recognition software to determine the presence identify and tracking of the person.

Figure 1:
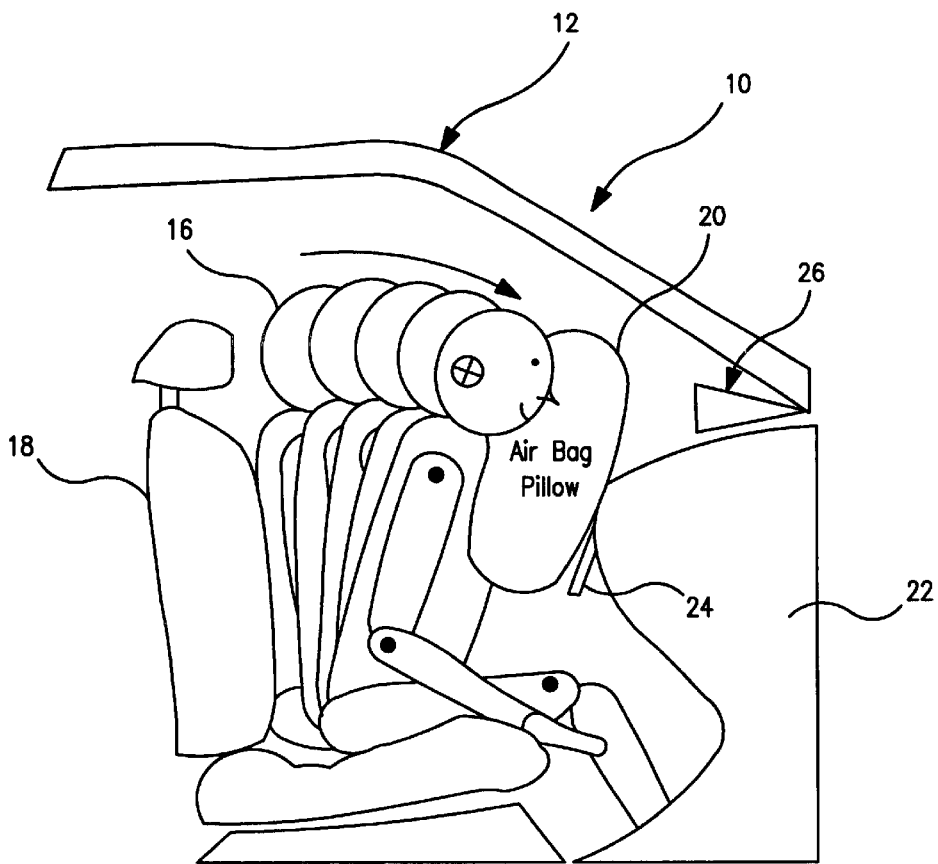
FIG. 1 is a side, cut-away, plan view of a person in the passenger seat of a vehicle in connection with an image sensing system for airbag deployment, according to an embodiment of the present invention.

FIG. 1 is a cut-away, side, plan view of the passenger side compartment 10 of a vehicle 12. In this depiction, a person 16 is shown in the passenger seat 18, where the person 16 is moving forward during a crash event. An airbag pillow 20 is shown being deployed through an airbag door 24 housed in an instrument panel 22 during the crash event.

Figure 2:
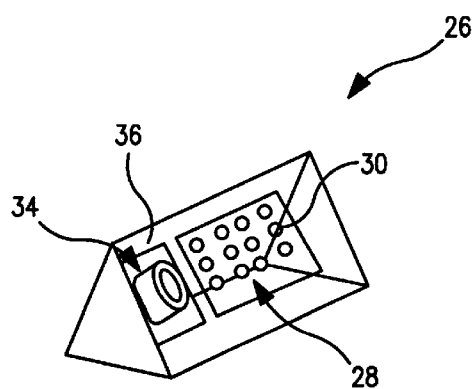
FIG. 2 is a perspective view of a video camera and LED illuminator unit employed in the airbag deployment system of the present invention.

A video camera and IR LED illuminator unit 26 is mounted on the instrument panel 22 at a location suitable for the purposes described herein. FIG. 2 is a perspective view of the unit 26 removed from the vehicle 12. The unit 26 includes a cluster 28 of IR LEDs 30. A plurality of LEDs 30 is provided to generate the necessary intensity for daylight operation. The cluster 28 emits a beam of IR radiation towards the person 16 that is reflected therefrom back towards the unit 26. A video camera 34 is provided in the unit 26 to receive the reflected radiation from the person 16. The video camera 34 is used by way of a non-limiting example in that any detector that detects infrared radiation suitable for the purposes described herein can be used.

A filter 36 is provided over the camera 34 to filter out radiation that is not within the desirable infrared range. The filter 36 can be any filter suitable for the purposes described herein, such as a $TiO_2$ filter or a polarizing filter. The filter layers and thickness can be chosen to transmit the IR image to the detector, but to reflect the visible image away from the detector. The polarizing filter can be used to reduce visible light to the detector using electro-optical polarization that passes the IR wavelengths, but strongly attenuates the non-IR wavelengths. FIG. 3 shows the luminance curve for sunlight, where the filter 36 passes infrared radiation in the 40 nm bandpass window. The filter 36 provides some protection against sunlight that may affect the operation of the airbag deployment system, and recognition of the face of the person 16.

In this embodiment of the present invention, a single camera is used to acquire and monitor the range of the person 16. The software employed to perform this function utilizes two separate locations on the occupant's face to provide the ranging. In a preferred embodiment, it is the person's eyes that are detected to provide the triangulation for ranging purposes. However, as will be appreciated by those skilled in the art, other facial features of the person 16 can also be used, such as the person's ears, etc. Also, the software algorithm allows the person's head size to be determined so that both eyes do not need to be in view to track the person after he has been acquired. Additionally, the software can be used to view other parts of the person's body, such as the person's torso, in combination with the facial feature or head size detection.

Because human facial features are unique, a database can be used to store specific information, such as eye-to-eye separation, about a person, so that the software can particularly identify that person. This is important, in one example, so that the system can identify children and fifth-percent females, and inhibit air bag firing for these people, as required by government mandated regulations. Also, being able to specifically identify a person improves the ranging accuracy of the system because the system knows that person's eye separation or other specific facial features.

Figure 4:
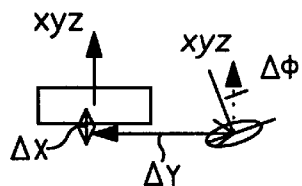
FIG. 4 is a representation of camera orientation and position parameters with respect to the center and normal of the airbag door.

The acquisition and tracking software needs to be calibrated for a particular seat position, airbag position, vehicle makeup, etc. FIG. 4 is a representation of the camera orientation and position parameters with respect to the center and normal of the airbag door 24. The three parameters that must be estimated in the vehicle for ranging according to the invention after the camera and Visionics Face-It software are calibrated include two position offsets and one angular offset. The two position offsets are the lateral offset of the camera 34 with respect to the center of the airbag ($\Delta$), measured laterally and perpendicularly to the normal vector out of the center of the airbag door 24, and the front or back offset ($\Delta X$) of the camera 34 with respect to the center of the airbag door 24, measured along an axis parallel to the normal out of the center of the airbag door 24. The angular parameter is the azimuth offset ($\Delta\theta$) between the optical axis of the camera 34 and the normal vector coming out of the center of the airbag 20. Only two of these parameters, $\Delta X$ and $\Delta\Phi$), are used in the modified monocular distance equation.

A calibration procedure, described below, can be used to determine $\Delta Y$, $\Delta X$ and $\Delta\Phi$. There is a trade off between measuring a large number of calibration points and linearly interpolating between them or measuring a small number of calibration points and non-linearly interpolating between them. In theory, calibrating with a large number of points would not require a model for estimating that is described herein. The cost of making the large number of measurements necessary for a brute force calibration and the possibility that out of range operation of the camera 34 or software might occur unnoticed with brute force calibration must be considered before using that approach. The approach used herein uses a small number of calibration tests in order to form a model for interpolation.

From FIG. 4, the following equations can be written in order to relate measurements made in the airbag door reference frame (xyz) to those made in the camera lens reference frame (xyz). Only face positions in front of the airbag door (x>o) are considered in the following equations. For $\rho,\theta$ (pitch or elevation angle) and $\phi$ (yaw or azimuth angle) defined in the camera's spherical coordinate system, the equations for displacements x and y in the airbag coordinate system are:

$$x = -\Delta X + \rho \sin(\theta + \Delta\theta) \cos(\phi + \Delta\phi) \quad (1)$$

$$y = -\Delta Y + \rho \sin(\theta + \Delta\theta) \sin(\phi + \Delta\phi) \quad (2)$$

This assumes that $\theta + \Delta\theta$ is fixed during the calibration. Rearranging equations (1) and (2) yields:

$$\frac{y + \Delta Y}{x + \Delta X} = \tan(\phi + \Delta\Phi) \quad (3)$$

Making eye coordinate readout measurements at fixed $x + \Delta X$, and then taking the slope of the tangent with respect to changes in y yields:

$$\frac{1}{x + \Delta X}\bigg|_{\text{fixed}\_x} = \frac{d \tan(\phi + \Delta\Phi)}{dy} \quad (4)$$

Knowing x and the result on the right side of equation (4), $\Delta X$ can be determined. Knowing $\Delta X$, equation (3) and the measured data can be used to determine $\Delta Y$. Then, using $\Delta X$ and $\Delta Y$, equation (3) and the data, $\Delta\phi$ can be determined. Using equation (3), and the fact that:

$$\text{eye\_separation\_distance} = y_{rt\_eye} - y_{left\_eye}, \quad (5)$$

the modified monocular equation follows from equation (6) for defining the objective parameter x, or the eye to airbag distance.

$$x = -\Delta X + \left|\frac{\text{eye\_separation\_distance}}{\tan(\phi_{\text{left\_eye}} + \Delta\Phi) - \tan(\phi_{\text{rt\_eye}} + \Delta\Phi)}\right| \quad (6)$$

The calibration table consists of a lookup table of the SDK determined eye coordinate as a pixel value linked to the associated ray slope, as viewed in the camera coordinate system. Equation (6) can be simplified in terms of ray slopes (tangents of singular angles), so that the calibration table can be used directly to determine the eye to airbag distance from monocular operation. Employing the tangent trigonometry identity in equation (7) below, $$\tan(a+b) = \frac{\tan(a) + \tan(b)}{1 - \tan(a)\tan(b)} \quad (7)$$

and applying this identify to equation (6), leaves the modified monocular equation in a form that can be used by direct look up of tangent/slopes from the calibration lookup table. This equation is given in equation (8) below.

$$x = -\Delta X + \left|\frac{\text{eye\_separation\_distance}}{\frac{\tan(\phi_{\text{left\_eye}}) + \tan(\Delta\Phi)}{1 - \tan(\phi_{\text{left\_eye}})\tan(\Delta\Phi)} - \frac{\tan(\phi_{\text{rt\_eye}}) + \tan(\Delta\Phi)}{1 - \tan(\phi_{\text{rt\_eye}})\tan(\Delta\Phi)}}\right| \quad (8)$$

Figure 5:
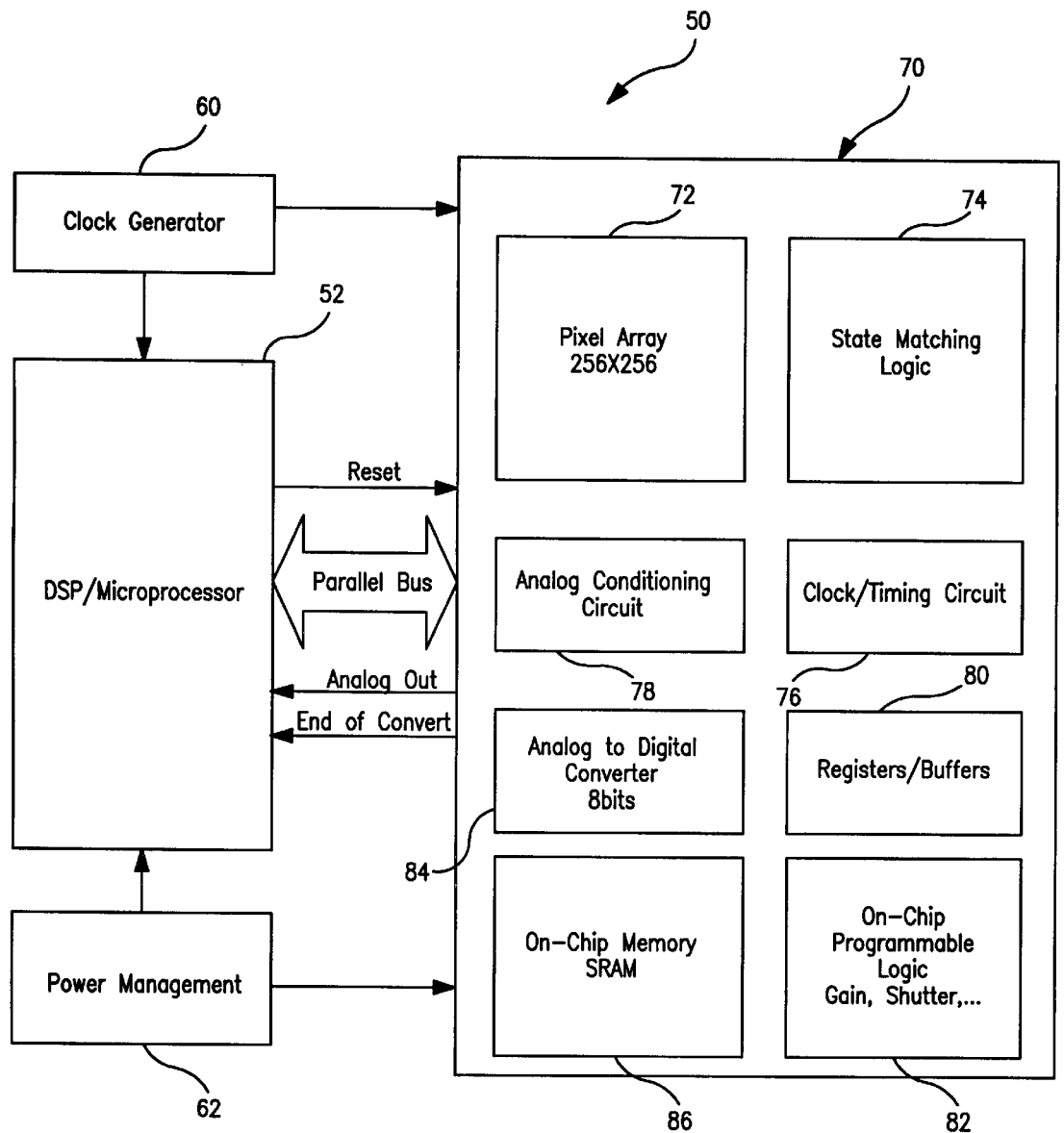
FIG. 5 is a block diagram of the airbag deployment system of the present invention.

FIG. 5 is a block diagram of an imaging system 50 of the invention including a digital signal processor (DSP) 52. The DSP 52 includes the face recognition software and ranging functions that performs the analysis on the image generated by the camera 34. A clock generator 60 provides timing for the various digital devices in the system 50, and a power management system 62 provides the power. The DSP 52 is connected to a CMOS chip 70 including a pixel array 72 that represents the IR detector, such as the camera 34. In this example, the pixel array 72 includes 256×256 pixels to provide the desired level of resolution. The CMOS chip 70 also includes various elements for timing and control purposes, including state matching logic 74, clock/timing circuitry 76, analog conditioning circuit 78, registers/buffers 80, on-chip programmable logic circuitry 82, etc. Additionally, an analog-to-digital converter 84 is also provided to convert the analog signal from the pixel array 72 to a representative digital signal. An on-chip SRAM memory 86 is shown for storage purposes, but can be off-chip as well. The operation of these devices in the system described herein would be apparent to those skilled in the art.

In one embodiment, the infrared LEDs 30 are continuously on to provide the reflected radiation received by the camera 34. However, typically some kind of filtering or signal processing must be done to correct for the problems caused by direct sunlight on the camera 34 that make it through the filter 36. Particularly, the system 50 needs to be able to distinguish between shadows caused by sunlight and actual edges of features on the occupant 16. According to the present invention, a frame differencing technique is employed that synchronously pulses the LEDs 30 on for a predetermined period of time and a predetermined number of frames of video data, and then off for a predetermined period of time over the same number of frames of video data. Then, the frames of data are subtracted from each other so that the frames without IR illumination can be subtracted from the frames with IR illumination, and the background can be eliminated. The detector is electronically shuttered synchronously with the pulses to provide exposure control. The frame differencing technique described herein is used in conjunction with the infrared pulsing to achieve the desired result. In other words, the frame differencing is synchronized to the infrared pulses.

The concept of frame differencing is the time-aperture, pixel-level storage of images using natural illumination only and natural illumination with added infrared illumination. Frame differencing allows these images to be subtracted to mitigate the effects of strong visible illumination. The set-up includes a neutral density filter that sets the IR illumination, plus worst case background to maximize analog-to-digital converter input. Face recognition requires that the worst case analog-to-digital range for the differenced image be 5 to 6 bits. The visible light would fit within the remaining range allowed by the analog-to-digital converter. The image differencing is either performed in the analog domain, where two pixel level capacitors are charged, one at each illumination level, or in the digital domain where a RAM memory of the digitized pixel output is taken at each illumination. The frame differencing acts to subtract out the illumination effects of the visible illumination, and to improve the image contrast. The frame differencing function can be performed in the acquisition/high bandwidth generation mode or in the narrow bandwidth track mode using pulsed LED illumination. The number of the electrons from the pulsed IR light source must be 10 times greater than the photon noise of the ambient illumination. Here, the noise of the ambient illumination is the square root of two times the number of electrons within the sun intensity, because two image frames are being acquired for every one IR image received.

FIG. 6 is a representation of how the frame differencing is performed in the camera 34, according to one embodiment of the present invention. FIG. 7 is a signal timing line showing the operation of the frame differencing technique of the invention. A pixel array 90 in the camera 34 receives radiation from the scene for a predetermined time period (10 $\mu$s) during a pulse of IR from the LEDs 30. At this time, the pixel array 90 receives ambient light and infrared light. The charge stored by each pixel or photodiode 92 in the array 90 is then transferred to a charge storage site 94 made up of a plurality of capacitors, one capacitor 96 for each pixel 92. About 10 $\mu$s later, at the end of the pulse from the cluster 28, the pixel array 90 detects just the ambient light for the same time period. The charge received by the pixel array 90 at this time period is stored in a capacitor storage site 98, having capacitors 100. An electronic shutter is employed in the detector to open and close at the appropriate time synchronously with the pulses of IR radiation for the operation described herein.

The two storage sites 94 and 98 are summed in a summation amplifier 102. The difference between the two storage sites 94 and 98 is then digitized by an analog-to-digital converter 104, and represents the frame of data where the ambient light has been removed. The readout of data takes about 10 ms, then at the next time period, the next pulse from the cluster 28 occurs. The complete frame differencing process can be performed on a single chip in CMOS where the pixel array 90 and the storage sites 94 and 98 are together. In an alternate embodiment, the frame differencing is performed at a different time period at an off-chip site, where the storage sites 94 and 98 are RAM.

The frame differencing technique of the invention can be described in the following manner. The variables are defined as ambient illumination I(x,y), direct ambient illumination T(x,y), scene reflectance R(x, y), and modulated source as L when on, and 0 when off. The response of the camera 34 is proportional to the product of reflectance and illumination.

$$S(x,y,\text{OFF}) = k^*(I(x,y)^*R(x,y)) + T(x,y)$$

$$S^*(x,y,\text{ON}) = k^*((L+I(x,y))^*R(x,y)) + T(x,y)$$

$$D(x,y) = S(x,y,\text{ON}) - S(x,y,\text{OFF}) = KL^*R(x,y)$$

This difference scene has much smaller dynamic range than the simple image S(x,y,OFF). The same benefit can be derived by reading out the frame with LED, then reading the frame without LED and subtracting the frames external to the camera 34. The penalty is increased dynamic range required to avoid saturation.

L must be much greater than the direct ambient illumination response on I. Thus, I is made as small as possible by using a narrow bandpass filter aligned in frequency to L. The raw sampling rate has to be twice the requirement set by the object tracking because two frames are differenced to get one frame to supply the face recognition software. The LEDs 30 have to be much faster. The IR radiation source has to be modulated such that all emission is during the time when all detectors are active. If the integration times of all pixels in the detector are not aligned, the available time for the source to be ON is reduced by the worst case misalignment.

Figure 8:
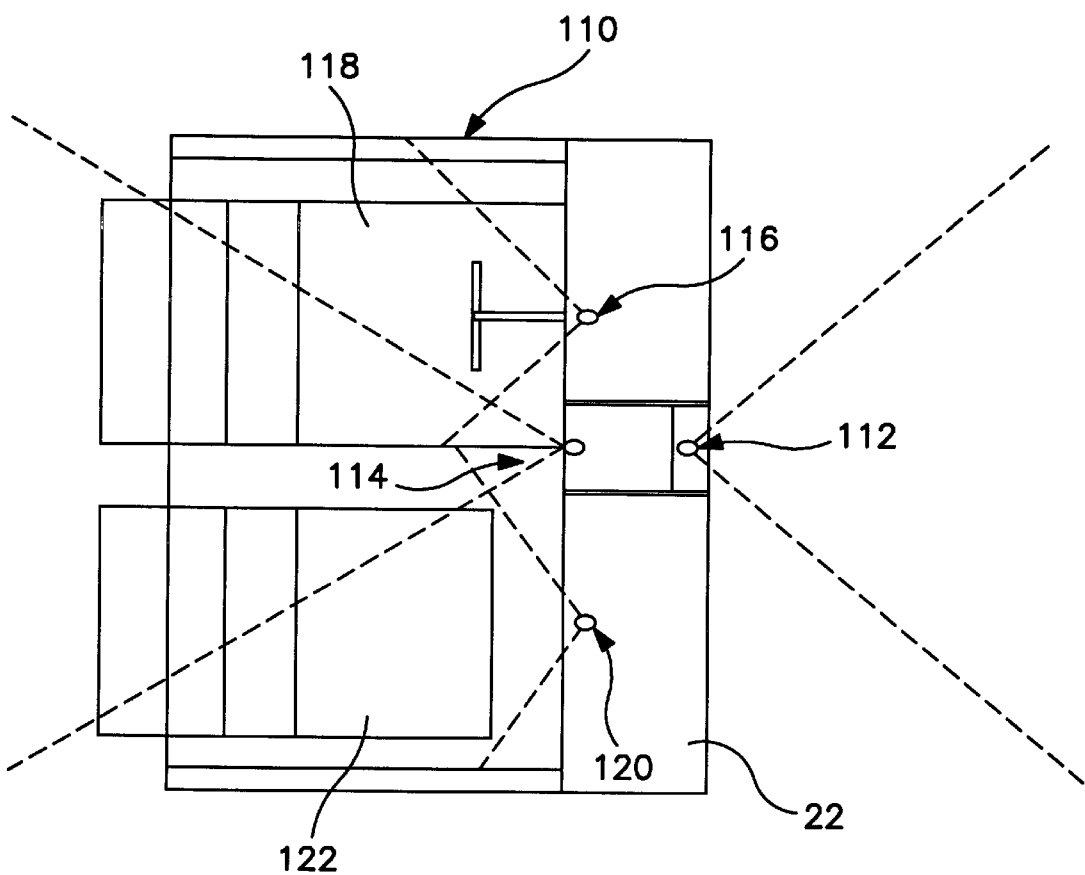
FIG. 8 is a top plan view of a vehicle showing various sensor locations for sensing different areas of the vehicle for various security and convenience purposes, according to an embodiment of the present invention.

The face recognition system described above for identifying and tracking a person in a vehicle passenger seat can be extended to other types of vehicle systems for other purposes. FIG. 8 is a top plan view of a vehicle 110 showing sensors or cameras positioned at various locations for other purposes. For example, a forward looking infrared sensor 112 is positioned at a center location on the instrument panel 22 and is directed forward for detecting objects in front of the vehicle. Additionally, a rearward looking infrared sensor 114 is positioned at a center location on the instrument panel 22 and is directed towards the rear passenger compartment of the vehicle 110 to monitor activity in that part of the vehicle. Additionally, an infrared sensor 116 is positioned on the instrument panel 22 in front of the driver seat 118 to detect the driver's facial features for various purposes discussed below. An infrared sensor 120 is positioned on the instrument panel 22 in front of the passenger seat 122 for airbag deployment as discussed above. The various sensors 112, 114, 116 and 120 can be used in different ways in different systems. Other sensor locations can also be employed for other purposes consistent with the discussion herein. Some of the applications are discussed below.

In one embodiment, according to the present invention, a sensor or camera is pointed towards the passenger and driver's seat that takes an image of the driver and the passenger's facial feature. Using the facial feature software, the facial features such as eyes, or any combination of 2-D or 3-D facial/head/torso feature coordinates of the driver and the passenger are compared to images stored in a computer data base or lookup table. If the software makes a match of the human face with one stored in the data base, the driver and/or passenger airbag will be adjusted so that that person's characteristics are used to personalize airbag deployment. This will help the airbag to automatically adjust for low weight, young persons, short drivers, etc.

According to the invention, a drowsy driver application involves identifying when the driver is falling asleep at the wheel and waking the driver up. Initially, at regular time intervals, the face recognition software acquires the facial features and their coordinates of the driver. Depending on the new coordinates of the driver's facial features, the software will send a warning to the driver that he or she is falling asleep. This warning will be based on the frequency of the driver's head nods, i.e., the back and forth head motion, whether the driver's eyes are closed, etc. In particular, the percentage of time that the eyes are closed during a fixed time interval is used to determine if the driver is asleep. Preliminary studies have shown that when a driver's eyes are shut more than 70% of the time over two seconds, the driver is drowsy and may be falling asleep. In addition, the back and forth motion of the driver's head or the driver's eyes looking at a cell phone will be utilized to determine if the driver is paying attention to the road ahead. The face recognition software can sense the difference in the driver's eye coordinates and this information can be relayed back to the driver. This information returns to the driver in the form of a mechanical motion, or an electrical stimulus or the production of a loud signal to wake the driver.

Similar to the drowsy driver application discussed above, drug use could cause the driver to fall asleep. Presently, many drivers use caffeine or speed to keep them awake over a long trip. However, when the drug wears off, the driver's response time diminishes to critical changes in road or driving conditions. Thus, monitoring of the driver's pupils will help detect a driver using drugs when the drugs stop working. Basically, the facial feature recognition software determines how often the iris of the eye is blocked by the driver's eyelid to determine whether the driver is falling asleep.

The facial feature recognition system described herein can also be used for driver identification. When the driver enters the vehicle, a camera pointing outward placed near the driver's door will take an image of the driver's facial features. Using the facial feature recognition software, the facial features such as eyes, or any combination of 2-D or 3-D facial/head/torso feature coordinates of the perspective driver are compared to images stored in the software data base. If the software makes a match of the face with one stored in the data base, the doors will open and the vehicle can be automatically started. Otherwise, the vehicle will remain in the off position. In an alternate embodiment, after the driver gains access to the vehicle and is in the driver seat, the camera can be used to identify the driver for purposes of starting the vehicle. Additionally, in a parental control situation, the driver can be identified as a young person, where the algorithm sets the control of the vehicle to a maximum speed for that driver's use.

The driver ID concept can be extended to driver convenience features using the face recognition software as well. Particularly, the driver's human facial features can be used to recall the driver's last seat position, rear and side mirror adjustment, steering wheel setting, radio setting, etc. In this example, the vehicle's computer can store the driver's last seat position, and rear and side mirror adjustment with the driver's human facial features. Subsequently, whenever the camera acquires the driver's facial features and this image matches a stored driver's personal preference, the seat and mirrors can be automatically repositioned to the desired locations.

The use of the specific imaging and processing techniques of the present invention allows the presence detection of people of all ages and sizes, whether conscious or asleep, in the interior of a vehicle with very high reliability. This detection is effective at all times, for stationary or moving vehicles, whether the engine is running or not, without being perturbed by external stimulus to the vehicle activities so that determination of dangerous human interior situations is enabled to generate warning alerts locally or to be communicated. This includes situations of abandoned children, medical emergency, captive occupants, sleeping occupants, etc.

Figure 9:
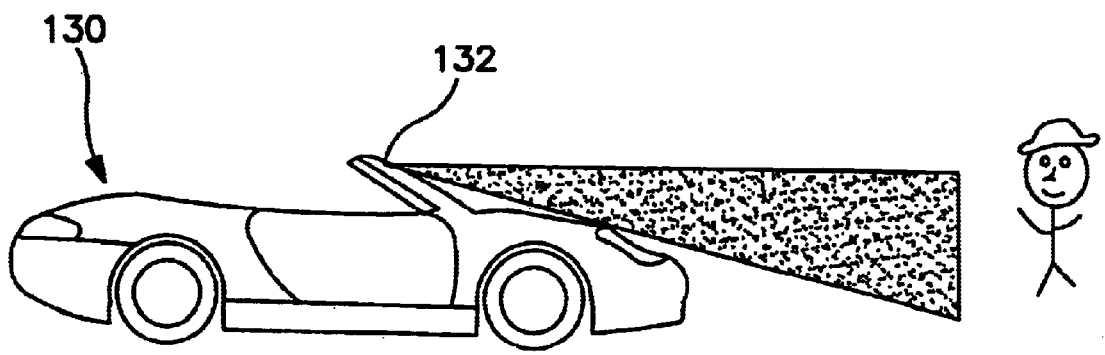
FIG. 9 is a side view of a vehicle showing a camera having a field-of-view for detecting objects in front of the vehicle, according to another embodiment of the present invention.

FIG. 9 is a side view of a vehicle 130 including a forwarded mounted sensor 132 that provides a sensor field-of-view in front of the vehicle 130. Reflections from objects in the forward looking direction, such as a pedestrian in a crosswalk, a slow moving vehicle, etc., will be registered by the processing system, and provide a warning to the driver of an object in the vehicle's path. By recognizing a pedestrian in a crosswalk or the like, pre-crash avoidance can be provided using the face recognition system of the present invention.

Figure 10:
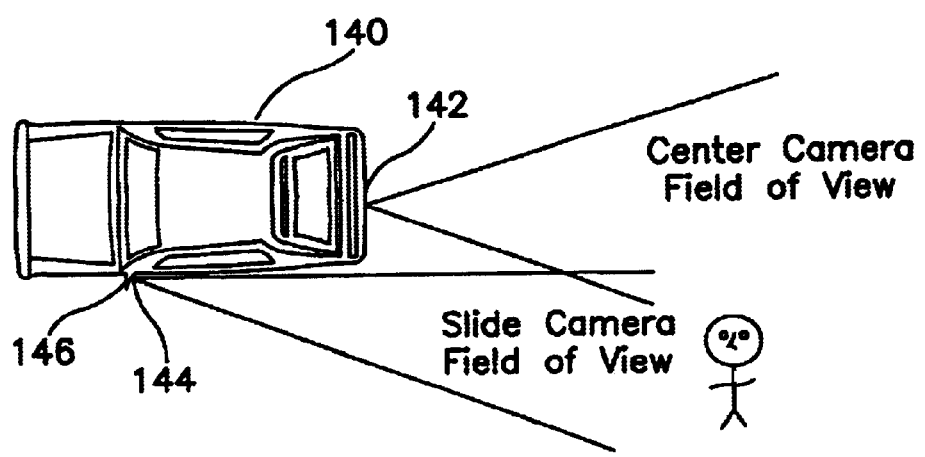
FIG. 10 is a top view of a vehicle including a side camera and a rear center camera for detecting objects at the side and rear of the vehicle, according to an embodiment of the present invention.

FIG. 10 is a top view of a vehicle 140 that includes a center mounted camera 142 behind the vehicle 140 for providing an indication of objects in the vehicle's path when it is moving in a rearward direction. Additionally, a camera 144 placed in the driver's side mirror 146 can detect objects located in the driver's blind spot to provide warnings that the driver may not see. In this example, the camera 144 will allow the driver to stay focused on the road ahead, but can still safely make a right or left turn or lane change. The camera 144 can be provided for detecting pedestrians or riders on bicycles in the vehicle blind spot by the face recognition system.

In severe automobile collisions, it is sometimes difficult to determine what caused the accident. In one example, before the crash event, the exterior forward looking camera can make pre-crash images. These images will be relayed back to the driver in the form of an electrical or mechanical warning so that the driver can make adjustments to avoid a collision. In the event of a vehicle collision, the images acquired will be stored so at a later date, the pre-crash sensing conditions will be available to make a post crash injury assessment. After the crash, a crash notification signal can be automatically transmitted in the form of a radio wave signal which will alert the police and fire department of the crash location.

Figure 11:
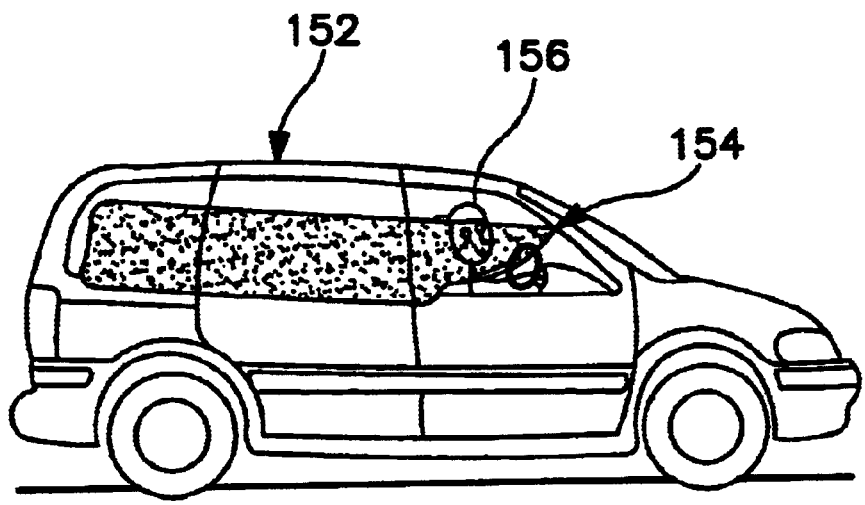
FIG. 11 is a side view of a vehicle including a camera positioned in front of the driver of the vehicle, according to another embodiment of the present invention.

To keep the driver's attention on the road and hands on the steering wheel, the driver's facial gestures, such as movement of facial features, can be used to perform tasks previously performed manually. For example, a driver's facial feature command can be compared to an existing stored facial feature that will cause the vehicle to automatically change the automobile controls without the driver taking his or her eyes off the road. Some examples include control of automobile accessories, such as turning on and off the radio, turning on and off the vehicle lights, turning on and off the windshield wipers or blowing the horn. FIG. 11 shows a side view of a vehicle 152 including a sensor 154 of the type discussed herein positioned in front of a driver 156 for identifying and tracking the facial features of the driver 156. The face recognition system of the invention can use this information in the manner as discussed herein.

Figure 12:
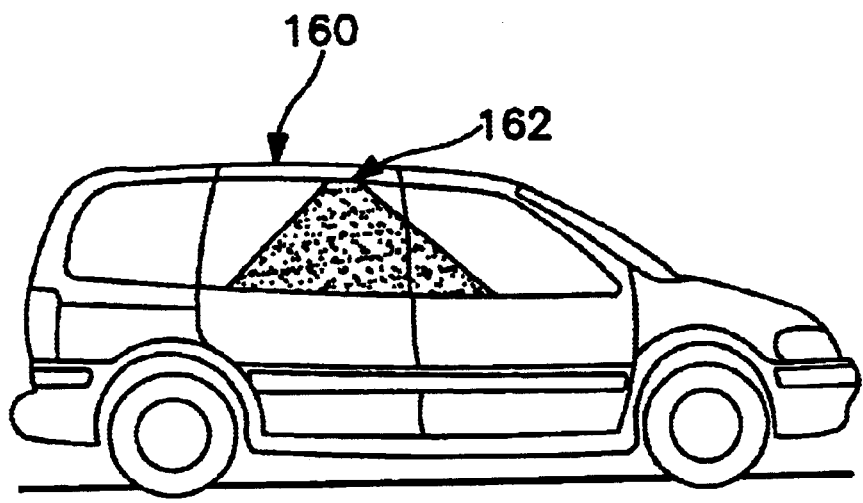
FIG. 12 is a side view of a vehicle including a camera mounted in the dome light of the vehicle for intrusion purposes, according to another embodiment of the present invention.

Further, a camera can be positioned in the vehicle to monitor intrusion. In this example, a camera takes an image anywhere inside of the vehicle passenger compartment. If a person is detected in the backseat of the vehicle, the camera will take an image of the person's facial features. If the facial features match one stored in the computer, then no alarm will go off. Otherwise, an alarm can be sounded to alert the driver that someone is in the back seat. The camera can provide a recording of the intruder for later identification, and provide detection of human presence after the vehicle is locked. FIG. 12 shows a side view of a vehicle 160 depicting this example, where a sensor 162 is mounted at a center location in the vehicle passenger compartment, such as in the center dome light.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An imaging system for a vehicle, said system comprising:
   an infrared source generating an infrared beam along a particular field-of-view in or around the vehicle;
   an infrared detector responsive to infrared radiation reflected from objects in the field-of-view of the infrared beam, said detector generating image signals from the reflected infrared radiation; and
   a processor responsive to the image signals from the detector, said processor including face recognition software that images and identifies a plurality of separate facial features of a person to detect a person's face, said processor comparing the detected image of the person's face with stored images, and causing a vehicle operation to be performed if a particular person's face is identified;
   wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

2. A drowsy driver detection system for a vehicle, said system comprising:
   an infrared source generating an infrared beam along a particular field-of-view in or around the vehicle, said source being pulsed on and off at predetermined intervals;
   an infrared detector responsive to infrared radiation reflected from objects from the field-of-view of the infrared beam, said detector generating image signals from the reflected infrared radiation; and
   a processor responsive to the image signals from the detector, said processor including face recognition software that images and identifies a plurality of separate facial features of a person to detect a person's face, said processor comparing the detected image of the person's face with stored images, said processor monitoring the eyes of the person and providing a signal if the person appears drowsy;
   wherein the infrared source is pulsed on for a predetermined period of time and a predetermined number of frames of video data and then is pulsed off for a predetermined period of time over the same predetermined number of frames of video data, and wherein the processor performs a frame differencing process whore the frames video data when the infrared source is on are subtracted from the frames of video data when the infrared source is off so as to eliminate background.

3. An imaging system for a vehicle, said system comprising:
   an infrared source generating an infrared beam, said infrared source being mounted at a forward location of the vehicle and providing a field-of-view in front of the vehicle;
   an infrared detector responsive to infrared radiation reflected from objects in the field-of-view of the infrared beam, said detector generating image signals from the reflected infrared radiation; and
   a processor responsive to the image signals from the detector, said processor including face recognition software that images and identifies a plurality of separate facial features of a person to detect a person's face, said processor providing a signal if a person's face is detected in front of the vehicle;
   wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

4. An imaging system for a vehicle, said system comprising;
   an infrared source generating an infrared beam along a particular field-of-view in or around the vehicle;
   an infrared detector responsive to infrared radiation reflected from objects in the field-of-view of the infrared beam, said detector generating image signals from the reflected infrared radiation; and
   a processor responsive to the image signals from the detector, said processor including face recognition software that images and identifies a plurality of separate facial features of a person to detect a person's face, said processor providing a signal if a person's face is detected in a blind spot of the vehicle;
   wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

5. An imaging system for a vehicle, said system comprising:
   an infrared source generating an infrared beam along a particular field-of-view in or around the vehicle;
   an infrared detector responsive to infrared radiation reflected from objects in the field-of-view of the infrared beam, said detector generating image signals from the reflected infrared radiation; and
   a processor responsive to the image signals from the detector, said processor including face recognition software that images and identifies a plurality of separate facial features of a person to detect a person's face, said processor providing a recording of people within or around the vehicle during a crash event;
   wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

6. An imaging system for a vehicle, said system comprising:
- an infrared source generating an infrared beam along a particular field-of-view in or around the vehicle;
- an infrared detector responsive to infrared radiation reflected from objects in the field-of-view of the infrared beam, said detector generating image signals from the reflected infrared radiation; and
- a processor responsive to the image signals from the detector, said processor including face recognition software that images and identifies a plurality of separate facial features of a person to detect a person's face, said processor providing a signal if an incapacitated person is detected in the vehicle;
- wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

7. An imaging system for a vehicle, said system comprising,
- an infrared source generating an infrared beam along a particular field-of-view in or around the vehicle;
- an infrared detector responsive to infrared radiation reflected from objects in the field-of-view of the infrared beam, said detector generating image signals from the reflected infrared radiation; and
- a processor responsive to the image signals from the detector, said processor including face recognition software that images and identifies a plurality of separate facial features of a person to detect a person's face, said processor monitoring gestures of the detected person to cause a vehicle operation to be performed;
- wherein the infrared source is pulsed on for a predetermined period of time and a predetermined number of frames of video data and then is pulsed off for a predetermined period of time over the same predetermined number of frames of video data, and wherein the processor performs a frame differencing process where the frames video data when the infrared source is on are subtracted from the frames of video data when the infrared source is off so as to eliminate background.

* * * * *

UNITED STATES PATENT AND TRADEMARK OFFICE
CERTIFICATE OF CORRECTION

PATENT NO. : 6,724,920 B1
DATED : April 20, 2004
INVENTOR(S) : John J. Berenz et al.

It is certified that error appears in the above-identified patent and that said Letters Patent is hereby corrected as shown below:

Column 11,
Line 56, after "process" delete "whore" and insert -- where --.

Signed and Sealed this

Twenty-first Day of June, 2005

JON W. DUDAS
*Director of the United States Patent and Trademark Office*